(12) United States Patent
Hága et al.

(10) Patent No.: US 8,554,202 B1
(45) Date of Patent: Oct. 8, 2013

(54) FAULTY WIRELESS TERMINAL DETECTION

(75) Inventors: Péter Hága, Budapest (HU); Zsolt Kenesi, Budapest (HU); András Veres, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/463,882

(22) Filed: May 4, 2012

(51) Int. Cl.
*H04W 24/00* (2009.01)
(52) U.S. Cl.
USPC ........ 455/425; 455/423; 455/418; 455/422.1; 455/522
(58) Field of Classification Search
USPC .............. 455/425, 423, 418, 422.1, 522
See application file for complete search history.

(56) References Cited

U.S. PATENT DOCUMENTS 6,980,602 B1 * 12/2005 Kleinerman et al. ......... 375/262
7,200,376 B2 * 4/2007 Cha et al. ..................... 455/275

FOREIGN PATENT DOCUMENTS

| EP | 1271978 A2 | 1/2003 |
| WO | 9810613 A1 | 3/1998 |
| WO | 0201899 A1 | 1/2002 |

\* cited by examiner

*Primary Examiner* — Nghi H Ly
(74) *Attorney, Agent, or Firm* — Coats and Bennett PLLC

(57) ABSTRACT

One or more embodiments of a method and apparatus taught herein provide for the detection of faulty wireless terminals in a wireless communication network. According to an exemplary method, an occurrence of one or more service incidents occurring for a wireless terminal during an observation time period is detected. For each service incident, a service quality score indicative of the severity of incident is determined. A performance metric is calculated responsive to the service quality scores of the wireless terminal occurring during the observation time period. The wireless terminal is determined to faulty if the performance metric exceeds a service quality threshold. A corresponding network node operable to implement the method is also disclosed.

22 Claims, 5 Drawing Sheets

FAULTY WIRELESS TERMINAL DETECTION

TECHNICAL FIELD

The present invention generally relates to quality of service (QoS) monitoring and, particularly, to detecting faulty wireless terminals in a wireless communication network.

BACKGROUND

A network operator of a wireless communication network may support a large quantity of wireless terminals. Such wireless terminals may include any of a variety of devices utilizing a wireless communication network, such as mobile phones (e.g., a user equipment or "UE," smartphones, PDAs), tablets, laptops, or even Machine Type Communication (MTC) devices. The user of a malfunctioning wireless terminal is likely to have a negative experience, and may unreasonably attribute such an experience to the network operator. Additionally, one a user having a faulty terminal may adversely affect the experience of other users having properly functioning terminals, through excessive interference or inability to conduct proper calls, for example. It is therefore desirable for network operators to proactively identify faulty wireless terminals within their networks.

Prior art detection methods have either relied on mobile terminals self-detecting their own faulty status, or have based a faulty determination only on transmission power of a mobile terminal or interference generated by a mobile terminal.

SUMMARY

According to one exemplary embodiment, a method for detecting faulty wireless terminals in a wireless communication network is implemented by a network node in the wireless communication network. According to the method, an occurrence of one or more service incidents occurring for a wireless terminal during an observation time period is detected. For each service incident, a service quality score indicative of the severity of incident is determined. A performance metric is calculated responsive to the service quality scores of the wireless terminal occurring during the observation time period. The wireless terminal is determined to be faulty if the performance metric exceeds a service quality threshold.

According to one exemplary embodiment, a corresponding network node in a wireless communication network is operative to detect faulty wireless terminals in a wireless communication network. The network node comprises one or more processing circuits configured to: detect an occurrence of one or more service incidents occurring for a wireless terminal during an observation time period; and determine, for each service incident, a service quality score indicative of the severity of incident. The one or more processing circuits are further configured to: calculate a performance metric responsive to the service quality scores of the wireless terminal occurring during the observation time period; and determine that the wireless terminal is faulty if the performance metric exceeds a service quality threshold.

The service incidents may be determined based on data obtained from a number of data sources in the wireless communication network.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
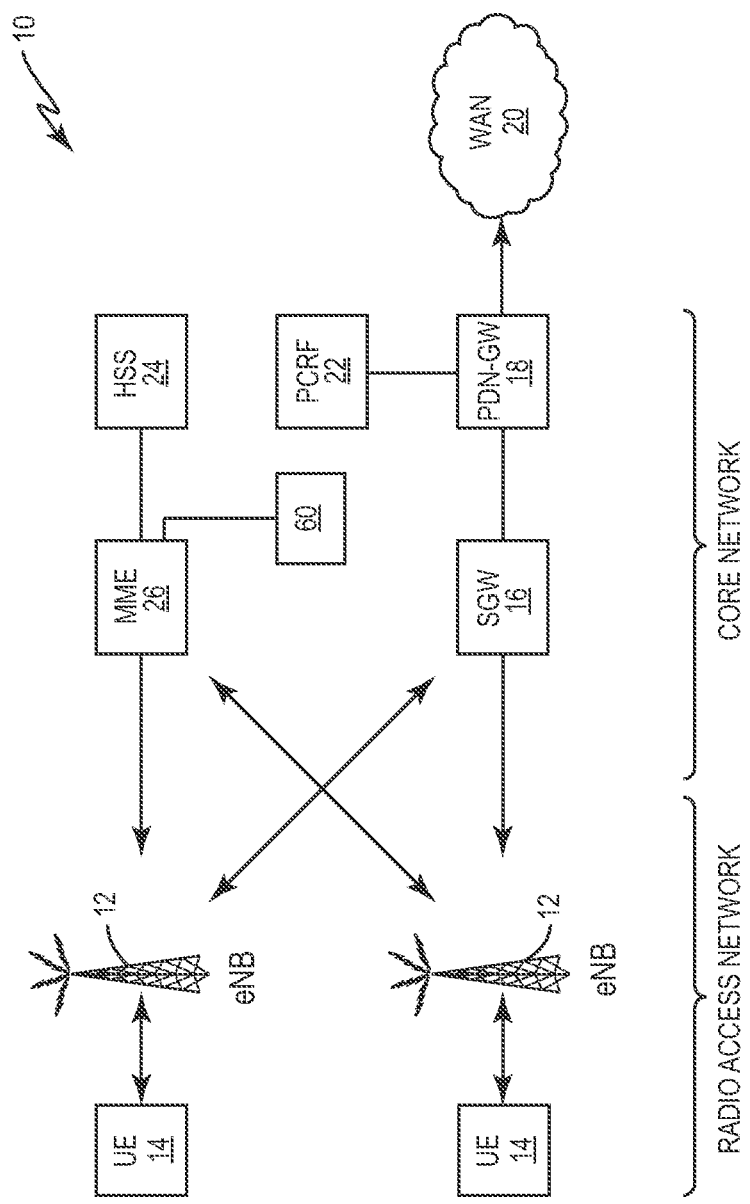
FIG. 1 is a block diagram of one embodiment of a wireless communication network.

FIG. 1 illustrates an example wireless communication network 10 in which service incidents may be detected to determine if supported wireless terminals are faulty. In the example of FIG. 1, the network 10 is a Long Term Evolution (LTE) network. The network 10 includes a plurality of eNodeB ("eNB") base stations 12 each supporting wireless communication with one or more user equipment (UE) wireless terminals 14. A serving gateway (S-GW) 16 forwards data packets from each UE 14 to and from a destination via a Packet Data Network Gateway (PDN-GW) 18. The PDN-GW 18 provides connectivity from each UE 14 to external packet data networks (e.g. WAN 20) by being the point of exit and entry of traffic for each UE. The PDN-GW 18 also performs policy enforcement and packet filtering. The WAN 20 is a wide area network, such as the Internet. Policy Charging and Rules Function (PCRF) 22 is connected to the PDN-GW 18. Home Subscriber Service (HSS) 24 is a database that contains user-related and subscription-related information for each UE 14. A Mobility Management Entity (MME) 26 interacts with the HSS 26 to perform user authentication, and transmits control plane signaling to the S-GW 16. As shown in FIG. 1, the items 12, 14 to a Radio Access Network ("RAN") portion of the network 10, and the items 16, 18, 22, 24, 26, and 60 correspond to a core network portion of the network 10.

Although an exemplary network node 60 operable to detect faulty wireless terminals in the network 10 is illustrated as being in communication with the MME 26, it is understood that this is only an example. It is further understood that this may be a logical connection rather than a physical one. Moreover, the network node 60 may have logical connections to other nodes (e.g., one or both of the eNodeBs 12) in addition to, or as an alternative to having a logical connection to the MME 26.

The network node 60 analyzes service data from the network 10 to detect the occurrence of service incidents. Such data may captured over standardized interfaces and standardized nodes (e.g., the eNodeB, MME, etc.) within the network. Some example service incidents may include, for example, UE attachment problems, call drop events, poor radio signal strength, interference, etc. If the node 60 ultimately determines that one of the UEs 14 are faulty, the faulty status may be indicative of a bad antenna, or a firmware issue with the UE, for example.

Figure 2:
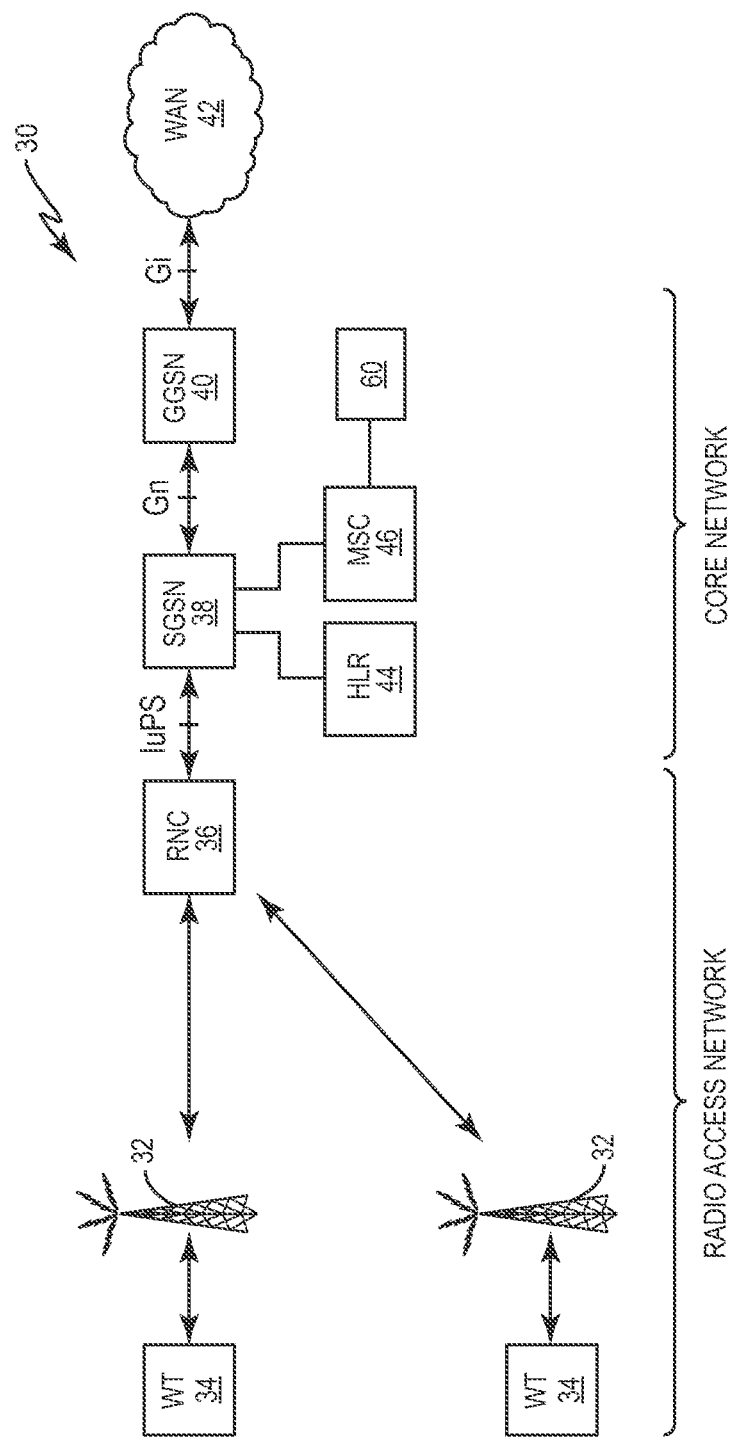
FIG. 2 is a block diagram of another embodiment of a wireless communication network.

FIG. 2 illustrates another example wireless communication network in which service incidents may be detected to determine if supported wireless terminals are faulty. In the example of FIG. 2, the network 30 is a 3G Universal Mobile Telecommunications System (UMTS) network supporting General Packet Radio Services (GPRS). The network 30 includes a plurality of NodeB base stations 32 each supporting wireless communication with one or more wireless terminals 34. A radio network controller (RNC) 36 controls each of the NodeBs. A serving GPRS support node (SGSN) 38 performs session management and GPRS mobility management, such as handovers and paging. A gateway GPRS support node (GGSN) 40 provides a gateway between the CN 44 and a packet data network (e.g. WAN 42) over the Gi interface, and may also implement authentication and location management functions. The SGSN 38 communicates with the RNC 36 over the IuPS interface, and communicates with the GGSN 40 over the Gn interface. Home Location Register (HLR) 44 stores subscription information of the calling party and Mobile Switching Center (MSC) 46 processes requests for service connections from mobile devices and land line callers, and routes calls between the base stations and the public switched telephone network (PSTN). As shown in FIG. 2, the items 32, 34, 36 correspond to a RAN portion of the network 30, and the items 38, 40, 44, 46, and 60 correspond to a core network portion of the network 30. In the network 30, service data may be obtained over standardized interfaces (e.g., the GI, GN or Iu-PS interfaces), and standardized nodes (e.g., the NodeB, RNC, etc.).

Although the exemplary network node 60 operable to detect faulty wireless terminals in the network 30 is illustrated as being in communication with the MSC 46, it is understood that this is only an example. It is further understood that this may be a logical connection rather than a physical one. Moreover, the network node 60 may have logical connections to other nodes (e.g., SGSN 38, RNC 36, etc.) in addition to, or as an alternative to having a logical connection to the MSC 46.

Of course, it is understood that the networks 10, 30 are only example networks in which a faulty terminal detection method could be performed, and those of ordinary skill in the art will appreciate that other types of wireless networks could be used. Also, the illustrated locations of the node 60 are only non-limiting example locations.

Figure 3:
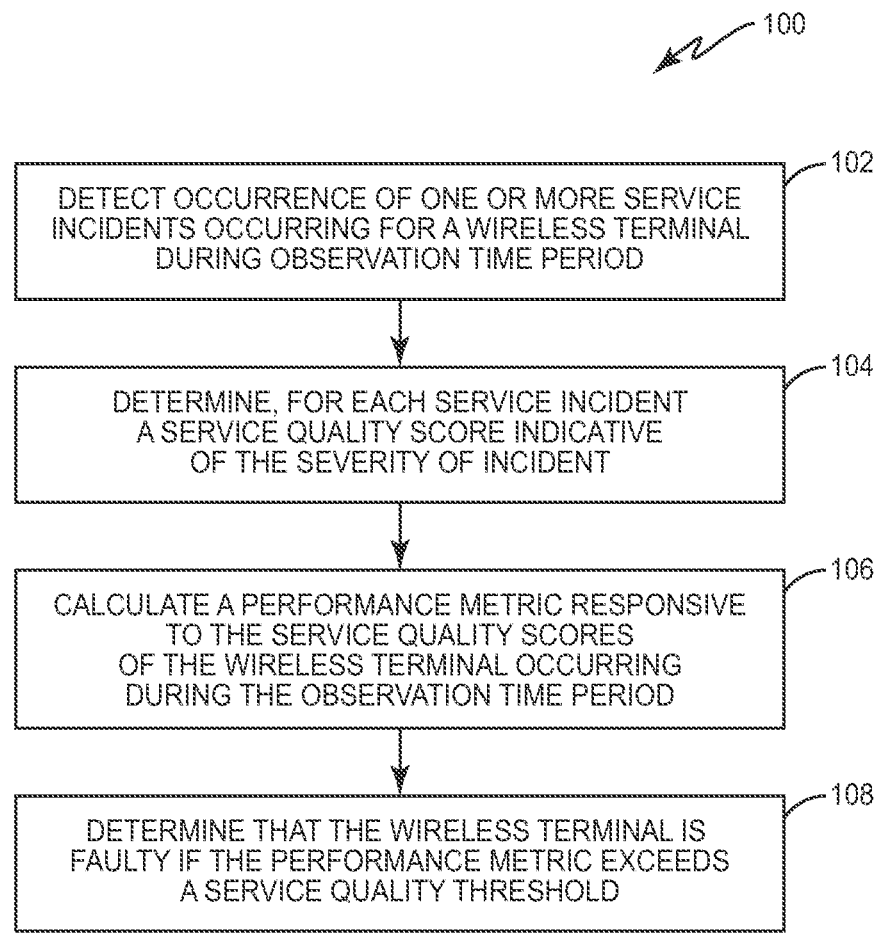
FIG. 3 illustrates a method of detecting faulty wireless terminals in a wireless communication network at a high level.

Referring to FIG. 3, a method 100 of detecting faulty wireless terminals in a wireless communication network is shown at a high level, with the method 100 being performed by the network node 60 in the wireless communication network. An occurrence of one or more service incidents occurring for a wireless terminal during an observation time period is detected (step 102). For each service incident, a service quality score indicative of the severity of incident is determined (step 104). A performance metric is calculated responsive to the service quality scores of the wireless terminal occurring during the observation time period (step 106), and the wireless terminal is determined to be faulty if the performance metric exceeds a service quality threshold (step 108). In this approach, the collection and analysis of performance data is done by the wireless network operator, and unlike the prior art, wireless terminals are not required to detect their own faulty status.

Figure 4:
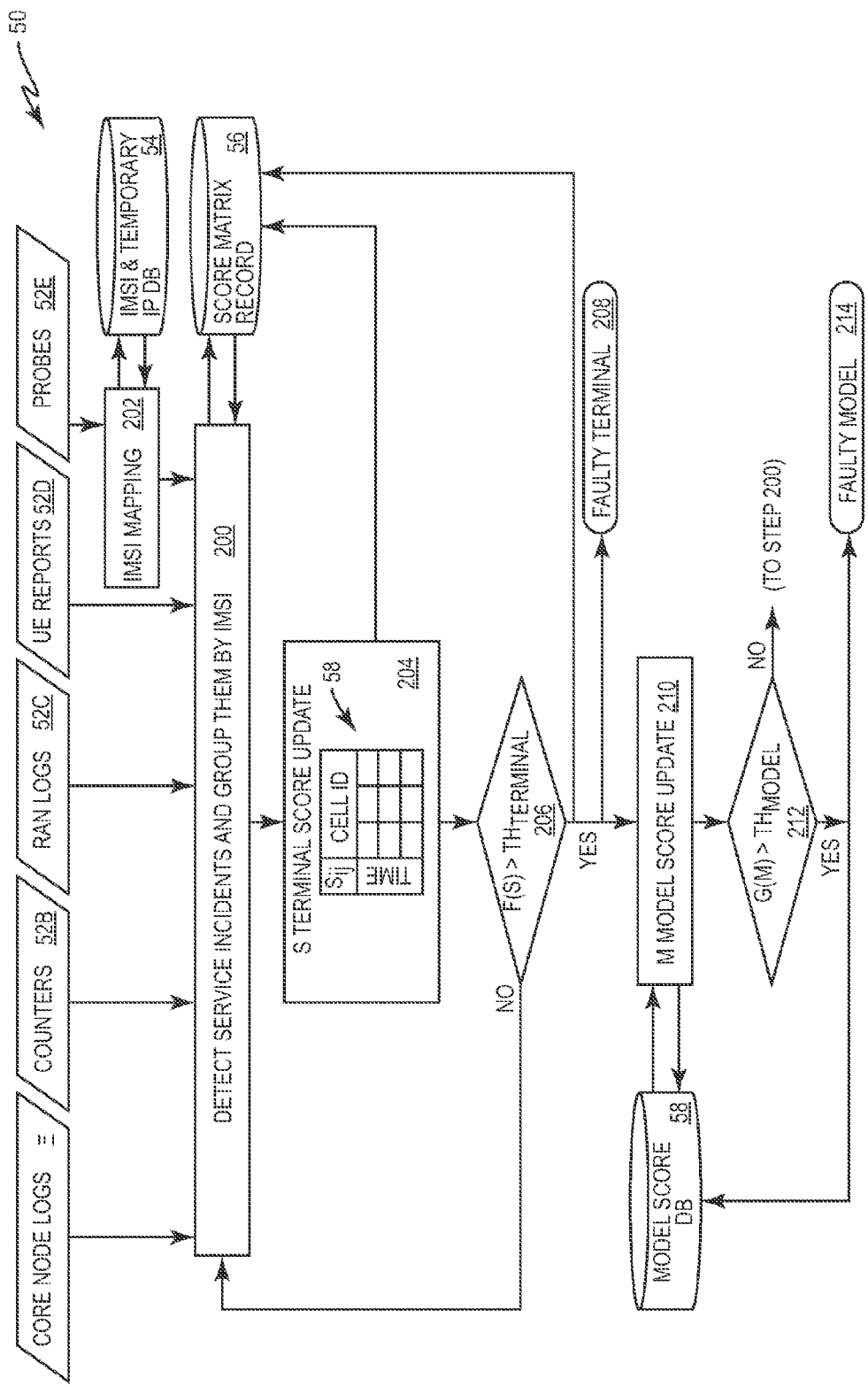
FIG. 4 illustrates a more detailed representation of the method of FIG. 1.

FIG. 4 illustrates a flowchart 50 of a more detailed representation of the method 100. Service data is obtained from a plurality of data sources 52. The data sources 52 may include raw data containing performance related values for active subscribers of one of the wireless communication networks 10, 30. Some example data sources include core node logs 52A, counters 52B, RAN logs 52C, UE reports 52D, and probes 52E. The core node logs 52A correspond to logs recorded in the core network portion of a wireless communication network. The counters 52B keep track of commonly used quantities of various network nodes (e.g., number of drops, how often a link is a bottleneck) and other various pieces of information about a cell. The RAN logs 52C may include event logs detailing signaling events for a given user within the RAN portion of a wireless communication network (e.g., channel used, cell used, handover details, etc.). The UE reports 52D may include information regarding a radio environment experienced by a wireless terminal, such as serving cell signal strength, strength of surrounding cell, transmit power, etc. The probes 52E correspond to independent machines or servers (not shown) in a wireless communication network that analyze a packet stream, to determine information about throughput.

Once gathered, the service data is grouped by wireless terminal, and service incidents are detected for specific wireless terminals (step 200). The data grouping is performed using at least one wireless terminal identifier, such as an International Mobile Subscriber Identity (IMSI). Some example service incidents include a wireless terminal experiencing a call drop event, low radio signal strength, or low throughput, for example. For data from probes 52e, a mapping may be performed (step 202) using IMSI/IP address database 54, to link recorded data to a given wireless terminal by associating an IMSI with a temporary IP address of a wireless terminal.

A rule engine may be used to determine the service incidents from the raw service data from data sources 52, and to record corresponding incident reports. Incident reports contain customer specific information (e.g., IMSI, mobile terminal type, subscription category, etc.) and an explanation of an identified problem (e.g., attach problems, drop events, radio signal strength, interference, etc.) with accompanying details.

Quality scores of the detected service incidents are determined and recorded in a terminal score matrix 58 (step 204), with each wireless terminal having its own matrix 58 that is stored in database 56. The example matrix 58 includes a plurality of rows, each corresponding to an "accumulation time period." The set of rows for each table (e.g., the three rows in the example of matrix 58) corresponds to a larger "observation time period." Thus, the larger observation time period is broken into smaller units of time (i.e., the accumulation time periods), each of which are represented by a row in the matrix 58. In one example, the accumulation time period is an hour or a day, and the observation time period is a week or a month. Of course, these are only non-limiting examples of possible time periods, and it is understood that other time periods could be used.

The matrix 58 also includes a plurality of columns, with each column corresponding to a cell that supported the wireless terminal during one or more of the accumulation time periods. Thus, if a given wireless terminal was supported by multiple cells within an accumulation time period, and experienced a service incident in each of those cells, data would be stored in multiple columns for that terminal during the accumulation time period. As longer time periods are used (e.g., days, weeks, months), it is quite likely that a given wireless terminal will be supported by multiple cells within an observation time period. Thus, the columns of the matrix are useful for segmenting service quality scores in such elongated time periods.

Step 204 includes determining which cells supported the wireless terminal during each of a plurality of accumulation time periods (i.e., which columns that incidents may have occurred in), and recording, for each accumulation time period, and for each cell, a sum of service quality scores occurring during the accumulation time period for service incidents occurring in that cell. The duration of the accumulation and observation time periods may be pre-determined, or may be dynamically determined based on a frequency of occurrence of service incidents, for example.

Once all service incidents occurring during the observation time period have been determined, a performance metric F(S) is determined and is compared to a first threshold ("th_terminal") (step 206). In one example, the performance metric may simply be a sum of all of the service quality scores occurring during each of the accumulation time periods within the greater observation time period, as shown by equation (1) below.

$$F(S) = \sum_{ij} S_{ij} \quad \text{equation (1)}$$

If the first performance metric F(S) does not exceed the first threshold, then steps 200-206 are performed for another observation time period. Otherwise, if the performance metric F(S) does exceed the first threshold, a determination is made that the wireless terminal corresponding to the IMSI in question is faulty (step 208), database 56 is updated accordingly, and an aggregate model score is incremented (step 210). Updating the aggregate model score corresponds to retrieving a cumulative score for the model of the faulty terminal from database 58, and updating that score. In one example incrementing the score includes incrementing a counter tracking a quantity of how many terminals of a given model are faulty.

A second performance metric for the model is then determined and compared to a second threshold ("th_model") (step 212). In one example, the second performance metric G(M) is calculated as shown in equation (2) below.

$$G(M) = \frac{\text{(number of faulty terminals of this model)}}{\text{(total number of terminals of this model)}} \quad \text{equation (2)}$$

If the second performance metric G(M) does not exceed the second threshold, then only the single terminal in question is determined to be faulty. Otherwise, if the second performance metric G(M) does exceed the second threshold, then the entire model of the terminal in question is determined to be faulty, and the database 58 is updated accordingly (step 214). Thus, the detection of a faulty wireless terminal is used to update a model score record in database 58 that collects the number of faulty terminals according to their terminal vendor and model.

After a faulty terminal determination (step 208) or faulty model determination (step 214), a report may be transmitted to a customer care call center or network operations center of the mobile network operator. Also, the device manufacturer may be notified.

Performance of the method 100 may be initiated in different ways. In one example, monitoring of service incidents is only performed for a certain set of cells due to performance issues observed for those cells. In one example, monitoring of service incidents is performed if a number of observed performance issues for a terminal or cell exceed a predefined threshold (e.g., call drops, high power, etc.). In one example, monitoring of service incidents is continuously performed for an entire network.

Figure 5:
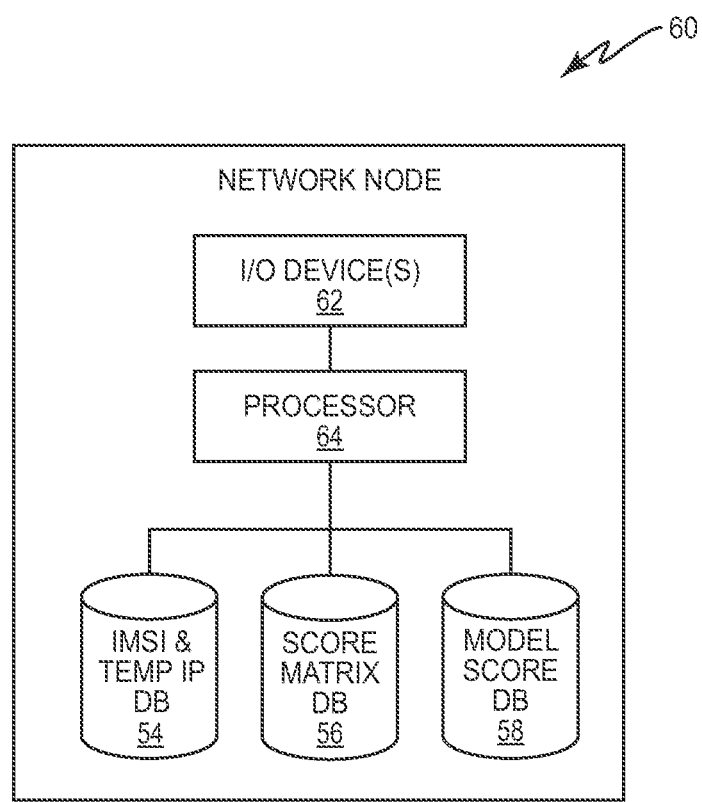
FIG. 5 illustrates a network node that is operative to detect faulty wireless terminals in a wireless communication network.

FIG. 5 illustrates a network node 60 that is operative to detect faulty wireless terminals in a wireless communication network (e.g., one of the networks 10, 30). The network node 60 includes one or more input/output (I/O) devices 62 and a processor 64. The processor 64 includes one or more control circuits operative to perform the method 100, and may include software, hardware, or any combination thereof. If software is utilized, the node 60 may include memory (not shown) for storing instructions for performing the method 100. The I/O device 62 facilitates communication between the node 60 and other components (e.g., data sources 52), which includes obtaining service data from the data sources 52. The processor 64 is in communication with databases 54-58. Although the databases 54-58 are shown as being located within the node 60, it is understood that this is only an example, and that the databases could be remotely located.

To further improve faulty terminal detection, the granularity of the matrix 58 may be increased to include additional and/or more detailed service data. Some exemplary additional measurements could include power headroom reports (uplink power vs. max uplink power), events indicating that maximum power is being used by a terminal, users being assigned the more coverage friendly 10 ms Enhanced Uplink (EUL) instead of 2 ms, channel state indicators or distributions, rank indicators, etc. Another way of improving fault detection is by improving the granularity of location to the sub-cell level, for example based on some positioning information, for example indicating the distance to the mobile (e.g., TA in GSM or LTE, RTT in WCDMA). In such embodiments, columns of the matrix 58 could correspond to sub-cells instead of entire cells.

The proposed methods and apparatus are advantageously able to automatically identify faulty mobile terminals based on their measured performance and other service data items. The radio and the performance measurements may be done by the network nodes of the mobile network operator, without requiring wireless terminals to self-detect their faulty status. The measurements may be done during voice calls and/or data connections, seamlessly, without any effect on the subscriber. By continually analyzing data from data sources 52, the network node 60 is able to continuously learn and adapt to the changing behavioral patterns of wireless terminals in a wireless communication network, and can gracefully handle the appearance of new terminal types.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method of detecting faulty wireless terminals in a wireless communication network, the method being performed by a network node in the wireless communication network, and comprising:
    detecting an occurrence of one or more service incidents occurring for a wireless terminal during an observation time period;
    determining, for each service incident, a service quality score indicative of the severity of incident;
    calculating a performance metric responsive to the service quality scores of the wireless terminal occurring during the observation time period; and
    determining that the wireless terminal is faulty if the performance metric exceeds a service quality threshold.

2. The method of claim 1, wherein said calculating a performance metric comprises:

calculating a sum of all service quality scores for the wireless terminal for each cell that supported the wireless terminal during the observation time period.

3. The method of claim 1, wherein the observation time period includes a plurality of smaller consecutive accumulation time periods, the method further comprising:
determining which cells supported the wireless terminal during each accumulation time period; and
recording, for each accumulation time period, and for each cell, a sum of service quality scores occurring during the accumulation time period for service incidents occurring in that cell.

4. The method of claim 3, wherein each sum of service quality scores occurring during the accumulation time period is stored in a region of a score matrix corresponding to a cell in which service incidents corresponding to the summed service quality scores were experienced.

5. The method of claim 1, wherein the service quality threshold is a first threshold and the performance metric is a first performance metric, and wherein if the first performance metric exceeds the first threshold, the following steps are also performed:
determining a model of the faulty wireless terminal;
incrementing an aggregate model score for the mobile terminal model; and
determining that the model is a faulty model if a second performance metric determined responsive to the aggregate model score exceeds a second threshold.

6. The method of claim 1, wherein events qualifying as service incidents include the wireless terminal experiencing a call drop event, low radio signal strength, or low throughput.

7. The method of claim 1, wherein said detecting an occurrence of one or more service incidents occurring for a wireless terminal during an observation time period comprises obtaining service data related to the wireless terminal from one or more network data sources.

8. The method of claim 7, wherein the one or more data sources include at least one of network node logs, network node counter output, mobile terminal reports, and probe reports.

9. The method of claim 8, wherein the service data is captured via at least one of the GI, GN and IU-PS interfaces.

10. The method of claim 8, wherein the one or more data sources include at least one of a Radio Network Controller (RNC), a Radio Base Station (RBS), an eNodeB and a Mobility Management Entity (MME).

11. The method of claim 1, wherein a length of the observation time period is dynamically determined responsive to a quantity or frequency of incident reports.

12. A network node in a wireless communication network, the network node being operative to detect faulty wireless terminals in the wireless communication network, and comprising one or more processing circuits configured to:
detect an occurrence of one or more service incidents occurring for a wireless terminal during an observation time period;
determine, for each service incident, a service quality score indicative of the severity of incident;
calculate a performance metric responsive to the service quality scores of the wireless terminal occurring during the observation time period; and
determine that the wireless terminal is faulty if the performance metric exceeds a service quality threshold.

13. The network node of claim 12, wherein the one or more processing circuits are configured to calculate the performance metric by calculating a sum of all service quality scores for the wireless terminal for each cell that supported the wireless terminal during the observation time period.

14. The network node claim 12, wherein the observation time period includes a plurality of smaller consecutive accumulation time periods, and wherein the one or more processing circuits are further configured to:
determine which cells supported the wireless terminal during each accumulation time period; and
record, for each accumulation time period, and for each cell, a sum of service quality scores occurring during the accumulation time period for service incidents occurring in that cell.

15. The network node of claim 14, wherein the one or more processing circuits are configured to store each sum of service quality scores occurring during the accumulation time period in a region of a score matrix corresponding to the cell in which service incidents corresponding to the summed service quality scores were experienced, the score matrix being stored in a score matrix database.

16. The network node of claim 12, wherein the service quality threshold is a first threshold and the performance metric is a first performance metric, and wherein if the first performance metric exceeds the first threshold, the one or more processing circuits are configured to:
determine a model of the faulty wireless terminal;
increment an aggregate model score for the mobile terminal model; and
determine that the model is a faulty model if a second performance metric determined responsive to the aggregate model score exceeds a second threshold.

17. The network node of claim 12, wherein events qualifying as service incidents include the wireless terminal experiencing a call drop event, low radio signal strength, or low throughput.

18. The network node of claim 12, wherein the one or more processing circuits are configured to detect an occurrence of one or more service incidents occurring for a wireless terminal during an observation time period by obtaining service data related to the wireless terminal from one or more network data sources.

19. The network node of claim 18, wherein the one or more data sources include at least one of network node logs, network node counter output, mobile terminal reports, and probe reports.

20. The network node of claim 19, wherein the service data is captured via at least one of the GI, GN and IU-PS interfaces.

21. The network node of claim 19, wherein the one or more data sources include at least one of a Radio Network Controller (RNC), a Radio Base Station (RBS), an eNodeB and a Mobility Management Entity (MME).

22. The network node of claim 12, wherein the one or more processing circuits are configured to dynamically determine a length of the observation time period responsive to a quantity or frequency of incident reports.

\* \* \* \* \*

UNITED STATES PATENT AND TRADEMARK OFFICE
CERTIFICATE OF CORRECTION

PATENT NO. : 8,554,202 B1
APPLICATION NO. : 13/463882
DATED : October 8, 2013
INVENTOR(S) : Haga et al.

Page 1 of 1

It is certified that error appears in the above-identified patent and that said Letters Patent is hereby corrected as shown below:

In the Drawings

In Fig. 4, Sheet 4 of 5, delete "[CORE NODE LOGS]" and insert --[CORE NODE LOGS 52A]--, therefor.

In the Specification

In Column 2, Line 41, delete "HSS 26" and insert -- HSS 24 --, therefor.

In the Claims

In Column 8, Line 6, in Claim 14, delete "node claim" and insert -- node of claim --, therefor.

Signed and Sealed this
Twenty-second Day of July, 2014

Michelle K. Lee
*Deputy Director of the United States Patent and Trademark Office*